(12) United States Patent
Baumbach

(10) Patent No.: US 8,085,857 B1
(45) Date of Patent: Dec. 27, 2011

(54) DIGITAL-COMPATIBLE MULTI-STATE-SENSE INPUT

(75) Inventor: Jason Baumbach, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 815 days.

(21) Appl. No.: 10/947,890

(22) Filed: Sep. 22, 2004

Related U.S. Application Data

(60) Provisional application No. 60/506,677, filed on Sep. 25, 2003.

(51) Int. Cl.
*H04B 3/00* (2006.01)
(52) U.S. Cl. .................................... 375/257; 375/244
(58) Field of Classification Search ................ 375/257; 371/21
See application file for complete search history.

(56) References Cited

U.S. PATENT DOCUMENTS

| | | | |
|---|---|---|---|
| 3,610,954 A | 10/1971 | Treadway | |
| 3,925,614 A | 12/1975 | Bousmar | |
| 3,938,184 A | 2/1976 | DeFrancesco et al. | |
| 4,128,812 A | 12/1978 | Pavlis | |
| 4,218,771 A | 8/1980 | Hogge, Jr. | |
| 4,330,863 A | 5/1982 | Wright | |
| 4,339,731 A | 7/1982 | Adams | |
| 4,520,489 A | 5/1985 | Hogge, Jr. | |
| 4,535,459 A | 8/1985 | Hogge, Jr. | |
| 4,538,283 A | 8/1985 | Hogge, Jr. | |
| 4,555,789 A | 11/1985 | Hogge, Jr. | |
| 4,561,098 A | 12/1985 | van Tol | |
| 4,565,976 A | 1/1986 | Campbell | |
| 4,584,695 A | 4/1986 | Wong et al. | |
| 4,587,653 A | 5/1986 | Hogge, Jr. | |
| 4,686,481 A | 8/1987 | Adams | |
| 4,724,401 A | 2/1988 | Hogge, Jr. et al. | |
| 4,744,084 A * | 5/1988 | Beck et al. ................... | 714/33 |
| 4,788,512 A | 11/1988 | Hogge, Jr. et al. | |
| 4,811,361 A | 3/1989 | Bacou et al. | |
| 4,821,293 A | 4/1989 | Shimizume et al. | |
| 4,884,041 A | 11/1989 | Walker | |
| 4,926,447 A | 5/1990 | Corsetto et al. | |
| 4,940,904 A * | 7/1990 | Lin ............................ | 327/256 |
| 5,015,970 A | 5/1991 | Williams et al. | |
| 5,036,298 A | 7/1991 | Bulzachelli | |
| 5,111,486 A | 5/1992 | Oliboni et al. | |
| 5,164,966 A | 11/1992 | Hershberger | |

(Continued)

FOREIGN PATENT DOCUMENTS

FR  2573592 A1  5/1986

(Continued)

OTHER PUBLICATIONS

Charles R. Hogge, Jr., "A Self Correcting Clock Recovery Circuit," Journal of Lightwave Technology, vol. LT-3, No. 6, Dec. 1985, pp. 1312-1314; 5 pages.

(Continued)

*Primary Examiner* — Shuwang Liu
*Assistant Examiner* — Michael Neff

(57) ABSTRACT

A method and an apparatus are described for sensing of a multi-state signal. An embodiment of a method includes driving a digital input line with a signal, the signal alternating between a first state and a second state. The method further includes sensing one or more values of the digital input line, and determining a state of the digital input line based on the sensed values.

13 Claims, 8 Drawing Sheets

U.S. PATENT DOCUMENTS

| | | | |
|---|---|---|---|
| 5,237,219 A | | 8/1993 | Cliff |
| 5,243,233 A | | 9/1993 | Cliff |
| 5,256,963 A | | 10/1993 | Johnson |
| 5,260,608 A | | 11/1993 | Marbot |
| 5,268,937 A | | 12/1993 | Marbot |
| 5,305,453 A | | 4/1994 | Boudry et al. |
| 5,315,271 A | | 5/1994 | Pascual et al. |
| 5,446,768 A | * | 8/1995 | Griffin et al. ............... 375/377 |
| 5,455,540 A | | 10/1995 | Williams |
| 5,477,176 A | | 12/1995 | Chang et al. |
| 5,486,824 A | * | 1/1996 | Kinerk et al. ............... 341/26 |
| 5,592,125 A | * | 1/1997 | Williams ...................... 331/1 A |
| 5,737,612 A | | 4/1998 | Ansel |
| 5,809,312 A | | 9/1998 | Ansel |
| 5,969,543 A | * | 10/1999 | Erickson et al. ............... 326/83 |
| 5,969,648 A | * | 10/1999 | Garnett ......................... 341/56 |
| 5,990,704 A | * | 11/1999 | Erickson et al. ............... 326/56 |
| 6,282,231 B1 | * | 8/2001 | Norman et al. ............... 375/144 |
| 6,421,757 B1 | * | 7/2002 | Wang et al. ................... 711/103 |
| 6,535,831 B1 | * | 3/2003 | Hudson et al. ............... 702/124 |

FOREIGN PATENT DOCUMENTS

| | | | |
|---|---|---|---|
| FR | | 2588433 A1 | 4/1987 |

OTHER PUBLICATIONS

Lee et al., "A 155-MHz Clock Recovery Delay- and Phase-Locked Loop," IEEE Journal of Solid-State Circuits, vol. 27, No. 12, Dec. 1992, pp. 1736-1746; 12 pages.

David G. Messerschmitt, "Frequency Detectors for PLL Acquisition in Timing and Carrier Recovery," IEEE Transactions on Communications, vol. COM-27, No. 9, Sep. 1979, pp. 1288-1295; 8 pages.

Llewellyn et al., "Session I: High-Speed Data Recovery WAM 1.1: A 33Mb/s Data Synchronizing Phase-Locked-Loop Circuit," Digest of Technical Papers, IEEE International Solid-State Circuits Conference, Feb. 17, 1988; pp. 12-13, 276-277; 4 pages.

Lai et al., "A Monolithic 622Mb/s Clock Extraction Data Retiming Circuit," ISSCC, 1991, Hewlett-Packard, pp. 144-145; 2 pages.

Walker et al., "A 1.5 Gb/s Link Interface Chipset for Computer Data Transmission," IEEE Journal on Selected Areas in Communications, vol. 9, No. 5, Jun. 1991, pp. 698-703; 6 pages.

Walker et al., "A Two-Chip 1.5-GBd Serial Link Interface," IEEE Journal of Solid-State Circuits, vol. 27, No. 12, Dec. 1992, pp. 1805-1810; 6 pages.

USPTO Notice of Allowance for U.S. Appl. No. 08/316,121 dated Sep. 16, 1997; 1 page.

USPTO Advisory Action for U.S. Appl. No. 08/316,121 dated Aug. 14, 1997; 1 page.

USPTO Final Rejection for U.S. Appl. No. 08/316,121 dated Apr. 25, 1997; 6 pages.

USPTO Non-Final Rejection for U.S. Appl. No. 08/316,121 dated Aug. 29, 1996; 9 pages.

USPTO Non-Final Rejection for U.S. Appl. No. 08/316,121 dated Jan. 26, 1996; 6 pages.

USPTO Notice of Allowance for U.S. Appl. No. 08/920,124 dated Apr. 14, 1998; 3 pages.

\* cited by examiner

Figure 5

```vhdl
library ieee;
use ieee.std_logic_1164.all;
use ieee.std_logic_unsigned.all;

entity threestateio is
port (
    clk : in std_logic;
    insig : inout std_logic;

-- logic_out is undefined for a case in which
-- highZ_out is '1' (when highZ_out is 1 logic_out has
-- no meaning)
    logic_out : buffer std_logic;
    highZ_out : buffer std_logic
    );
end threestateio;

architecture behav of threestateio is
  signal highZ_count : std_logic_vector(0 to 1) := "00";
  signal weakdriver : std_logic := 'L';
begin
 process(clk)
 begin
   if clk'event and clk='1' then
-- This indicates strong assignments (line is driven)
-- The highZ_count value is cleared to keep from bumping
-- into highZ erroneously
     if   insig = '0' and weakdriver = 'H' then -- 2, 6, 10
       highZ_count <= "00";
       highZ_out <= '0';
       logic_out <= '0';
     elsif insig = '1' and weakdriver = 'L' then -- 3, 7, 11
       highZ_count <= "00";
       highZ_out <= '0';
       logic_out <= '1';

-- Next, the two cases in which the forcing polarity
-- is aligned with the weak driving polarity are covered
-- (Nothing is done with highZ_out or highZ_count in these
-- cases)
     elsif insig = '0' and weakdriver = 'L' then
       logic_out <= insig;
     elsif insig = '1' and weakdriver = 'H' then
       logic_out <= insig;
```

Figure 6

```
-- For high Z sensing, signal is deemed to be high impedance
-- only after the detected signal switches a certain number
-- of times in a row. (Such as from 0 to 1 and back to 0
-- or from 1 to 0 and back to 1)
-- In this case, the highZ counter will be incremented if
-- the line is actively driven, but this occurs only once
-- before a strong assignment is reached.
      elsif insig = 'L' and weakdriver <= 'L' then -- 5
        highZ_count <= highZ_count + 1;
      elsif insig = 'H' and weakdriver <= 'H' then -- 4
        highZ_count <= highZ_count + 1;
      end if;

-- In this example, the highZ assignment asserts the
-- highZ condition once the weak driver has toggled the
-- line three times
-- In this process, after an initial highZ assignment the
-- highZ_out signal will stay high, but the counter will
-- wrap around, which is acceptable
      if highZ_count = "11" then highZ_out <= '1'; end if;

-- Toggle the weak output driver
      if weakdriver = 'L' then weakdriver <= 'H';
      else weakdriver <= 'L';
      end if;
      insig <= weakdriver;

end if;
  end process;
end behav;
```

Figure 7

```
library ieee;
use ieee.std_logic_1164.all;
use std.textio.all;

ENTITY tb is End tb ;

ARCHITECTURE arch of tb IS
   COMPONENT threestateio IS
     port (
       clk : in std_logic;
       insig : inout std_logic;
       logic_out : buffer std_logic;
       highZ_out : buffer std_logic
       );
   END COMPONENT ;

CONSTANT period : time := 100 ns ;  -- using a 10MHz clock
   SIGNAL clk      : std_logic := '0' ;
   SIGNAL outsignal  : std_logic := 'Z' ;
   SIGNAL logicsignal : std_logic := '0' ;
   SIGNAL highZsignal : std_logic := '0' ;
   signal lfsr_drive : std_logic_vector(1 to 10) := 0000000001";
   signal lfsr_Z : std_logic_vector(1 to 6) := "000001";
   signal temp : std_logic := '0';
begin
   U1: threestateIO
     PORT MAP(
       clk    => clk,
       insig    => outsignal,
       logic_out   => logicsignal,
       highZ_out  => highZsignal) ;
   ClkProcess: PROCESS(clk)
   BEGIN
     clk <= NOT clk after period / 2 ;
--   lfsr_drive(2 to 10) <= lfsr_drive(1 to 9);
--   lfsr_drive(1) <= lfsr_drive(7) xnor lfsr_drive(10);
   END PROCESS ;
```

Figure 8

```
inputProcess: PROCESS
BEGIN
  outsignal <= '0';
  wait for period * 4;
  outsignal <= '1';
  wait for period * 4;
  outsignal <= '0';
  wait for period * 4;
  outsignal <= '1';
  wait for period * 4;
  outsignal <= '0';
  wait for period * 4;
  outsignal <= '1';
  wait for period * 4;
  outsignal <= '0';
  wait for period * 4;
  outsignal <= 'Z';
  wait for period *30;
  wait for period / 2;  -- shift the clock by 180 degrees
END PROCESS;
END arch ;
```

DIGITAL-COMPATIBLE MULTI-STATE-SENSE INPUT

This application claims the benefit of U.S. Provisional Application No. 60/506,677, filed Sep. 25, 2003.

FIELD OF THE INVENTION

The invention relates generally to electronic circuits. More particularly, the invention relates to sensing of multiple states for a digital signal.

BACKGROUND

In electronics, a signal may have multiple states that need to be detected in order to understand the signal. In the most common circuits a signal is binary, having only two possible states. The detection of two states, which are generally high (which may be represented as "1") or low (which may be represented as "0"), is relatively easy. In a simple example, a signal that is above a certain threshold voltage is high, while a signal that is below a certain threshold voltage is low.

However, some operations use a signal having a greater number of states, such as a three-state, or ternary, signal. In one example, the states for such a signal may be high, low, and high impedance, although three voltage levels may be used in some cases. The introduction of an additional state, while potentially allowing transfer of a great deal more information, creates complications in detection. A simple binary detection circuit will not be able to sense a third state, such as a high impedance state.

In a conventional detection environment, the detection of three states requires either greater complications in detection techniques or additional signal lines to transfer the information for the third state. In a first conventional example, ternary sensing is used, in which three discrete voltage levels are directly sensed. However, such a circuit is not compatible with common binary digital signaling standards, and thus is contrary to the preference for retaining compatibility with common signaling standards.

In second convention example, a pair of binary digital inputs may be utilized. However, while this method actually allows the sense of four states total, it requires that two binary lines be utilized for three states. This method increases the pin count and number of signal lines needed, when the preference is to convey as much information as possible using as few pins as possible.

In a third conventional example, a line may be precharged and then tested. Such a process assumes that the device under test is stimulated, and then the input is sensed. This assumption greatly limits the applicability of the technique to situations in which the user has control of the device driving the input since it does not allow for the continuous sense of the input to determine the high-impedance state.

BRIEF DESCRIPTION OF THE DRAWINGS

The present invention is illustrated by way of example, and not by way of limitation, in the figures of the accompanying drawings in which like reference numerals refer to similar elements, and in which:

FIGS. 5 and 6 contain sample code to simulate signal detection; and

FIGS. 7 and 8 contain sample code to define stimulus for the simulation of signal detection.

DETAILED DESCRIPTION

Figure 1:
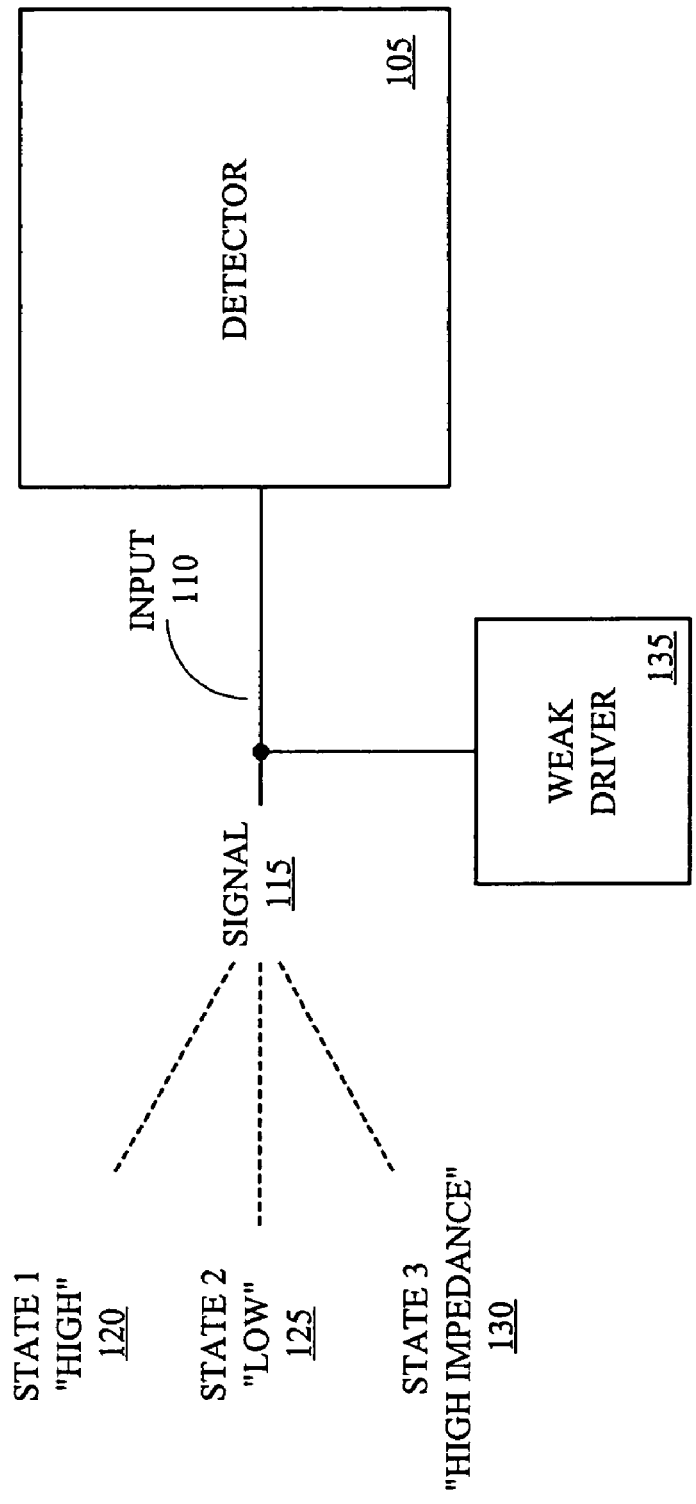
FIG. 1 is an illustration of ternary signal detection.

In one embodiment of the present invention detection of a multi-state signal is provided.

In one embodiment of the invention, a system detects three signal values on a signal line, which may be referred to as a ternary signal system. The signal may have a value of "high" or "low", or may be undriven, a "high impedance" or "high Z" value.

In one embodiment of the invention, a single-ended digital I/O (input/output) system is utilized to sense when an input is not driven, and thus is in the third state. In one embodiment, the signal line is alternately driven with a weak digital "1" (or "high") and a weak digital "0" (or "low"). In one embodiment, a signal history is used to determine if the input is being actively driven or is undriven.

In one embodiment of the invention, three separate states are sensed on a signal line using a single digital input, rather than the signal line being limited to a normal binary ("1" or "0") input. An embodiment of the invention may thus be compatible with single-ended binary electrical systems such as TTL (transistor-transistor logic), LVTTL (low voltage transistor-transistor logic), CMOS (complementary metal oxide semiconductor), LVCMOS (low voltage complementary metal oxide semiconductor), and others. Ternary sensing is generally not compatible with digital I/Os because the input characteristics do not match the characteristics of digital drivers.

In one embodiment of the invention, sensing of three states may be accomplished using a digital input, a synchronous finite state machine (FSM), and a toggling weak driver. An input device under test (DUT) will provide a signal by driving the input with a logic '0' (low), driving the input with a logic '1' (high), or leaving the output undriven (high-impedance). In one embodiment, a detection system will continually drive the input line with a weak driver that provides a signal that is easily overcome by an external driver of normal strength. The value driven by the weak driver alternates between a weak high and a weak low signal. In one embodiment, the weak driver value may utilize the output of a T-type flip-flop that is driven by a clock. However, any circuit that generates a binary alternating pattern may be used in an embodiment of the invention.

In one embodiment of the invention, a history of the values sensed by a detector is used to determine the state of the signal on the input line. An input signal value can be determined using a finite state machine that operates according to the criteria provided in Table 1.

TABLE 1

| Value driven on line | Value sensed on line | Action |
| --- | --- | --- |
| Weak low | High | FSM determines "high" state |
| Weak high | Low | FSM determines "low" state |
| Weak low | Low | Increment impedance counter in FSM |
| Weak high | High | Increment impedance counter in FSM |

When the input is actively driven by an external driver, a weak internal driver is not able to overcome the external driver. As a result, a transition from a weak "low" to a "high" state can be determined to be a "high" signal. This is the result of the external driver overriding the signal of the weak internal driver. Similarly, a transition from a weak "high" to a "low" state can be determined to be a "low" signal.

When the output is undriven and the line is in a high-impedance state, the action of the toggling weak driver will switch the logic level sensed by the input. A counter can be used to count a number of times that the weak driver has switched the logic level of the input. When it is determined that the weak driver has switched the input a specified number of times, then the finite state machine can determine that the input is in the undriven or "high impedance" state. In one embodiment, the number of times that the input is switched will depend on, among other elements, the degree of certainty required for signal detection. The first time a signal is driven, it may coincidentally be the same as an external signal. For this reason, the weak signal needs to be switched and the detected output needs to follow the weak driven signal for at least two consecutive clock cycles to detect a high impedance signal, but additional clock cycles may be utilized to provide a greater certainty and ensure that a glitch has not occurred in the signaling.

FIG. 1 is an illustration of ternary signal detection. In this embodiment, a detector 105 is to detect a signal 115 on a line 110. In one embodiment, the signal can be a "high" signal 120, a "low" signal 125, or an undriven/high impedance signal 130.

In one embodiment of the invention, a weak driver 135 alternatively drives a weak "high" and a weak "low" on the line 110. The detector 105 then detects the resulting signal 115 on the line 110. In one embodiment of the invention, the detector may wait a certain delay period before detecting the signal to allow transitory "ringing" in a signal to dissipate. If the detected signal is the opposite of the weakly driven signal, with a "high" detected when driving a weak "low" or a "low" detected when driving a weak "high", then the detected signal is determined to be the state of the signal.

If the detected signal is the same as the weakly driven signal, then the weak driver 135 toggles to the opposite state and the signal is again detected. If the detected signal now is the opposite of the weakly driven signal, then the detected signal is determined to be the state of the signal. If the detected signal follows the weakly driven signal for a certain number of repetitions, the number of repetitions being two or more, then the signal is determined to be an undriven or "high impedance" signal.

Figure 2:
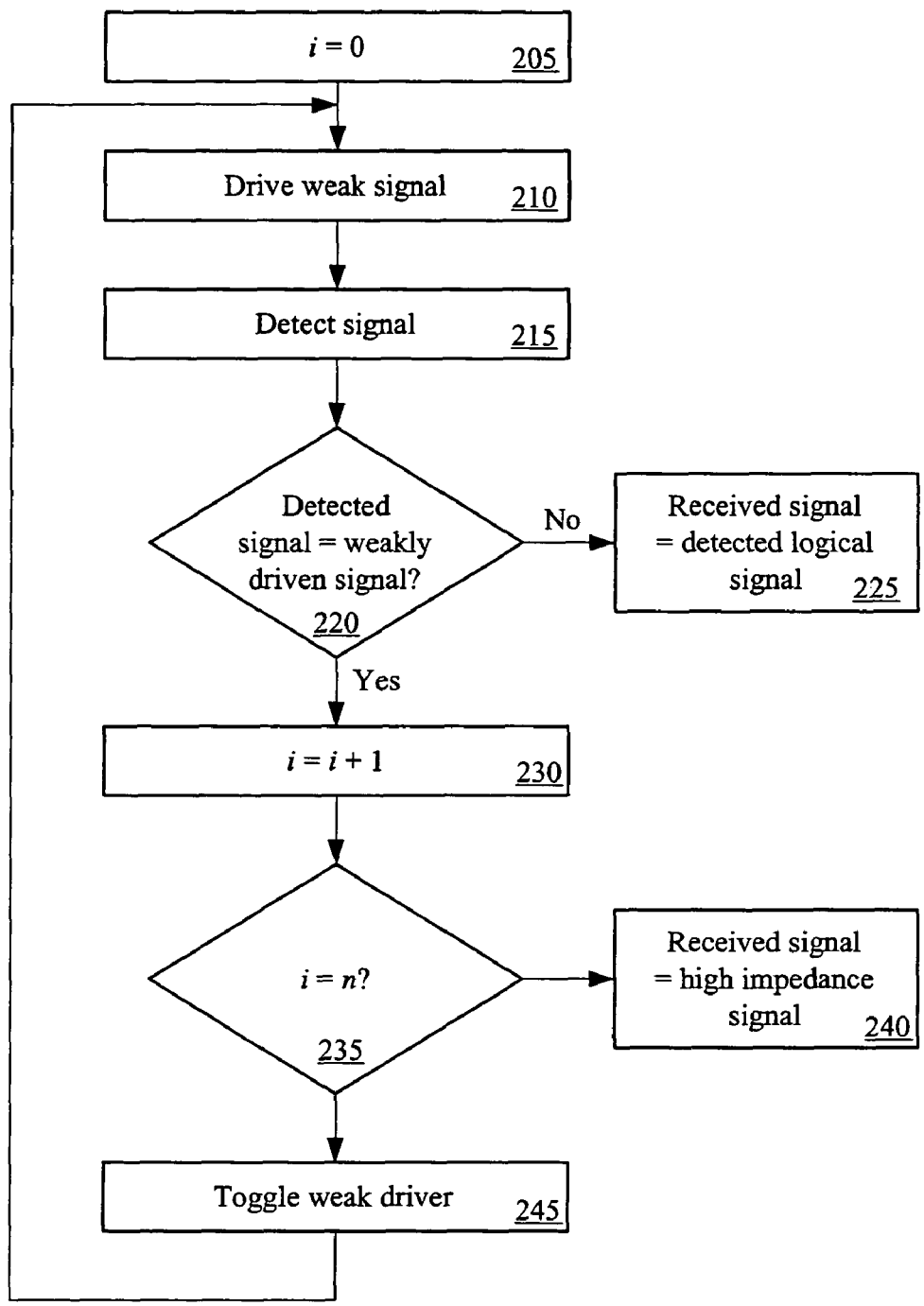
FIG. 2 is a flow chart illustrating an embodiment of signal detection.

FIG. 2 is a flow chart illustrating an embodiment of signal detection. Initially a counter i is set to zero 205. The operation of the counter may represent an operation of a finite state machine. In this embodiment, an I/O system drives a weak "high" or "low" signal on a line 210. The weak internal driver signaling may begin with either a "high" or "low" signal. The I/O system then detects the state of the signal 215, the I/O being required to only discern between a "high" signal value and a "low" signal value on a single line. If the detected signal does not match the weakly driven signal 220, thus indicating that an external driver has overridden the weakly driven signal, then the signal may be deemed to be the detected logical signal 225.

If the detected signal matches the detected signal 220, then the counter is incremented 230. If the counter equals a value n 235, with n being at least 2, then the signal may be deemed to be an undriven/high impedance signal 240. If n does not equal the value n, then the weak driver is toggled 245 to produce the opposite signal and a weak signal is again driven on the line 210. In the next iteration, the detected signal may now no longer match the weakly driven signal 220, indicating that the signal is driven and the detected and weakly driven signals had matched coincidentally in the first iteration. If the detected and weakly driven signals again match, then the iterations continue until the counter reaches the required value.

Figure 3:
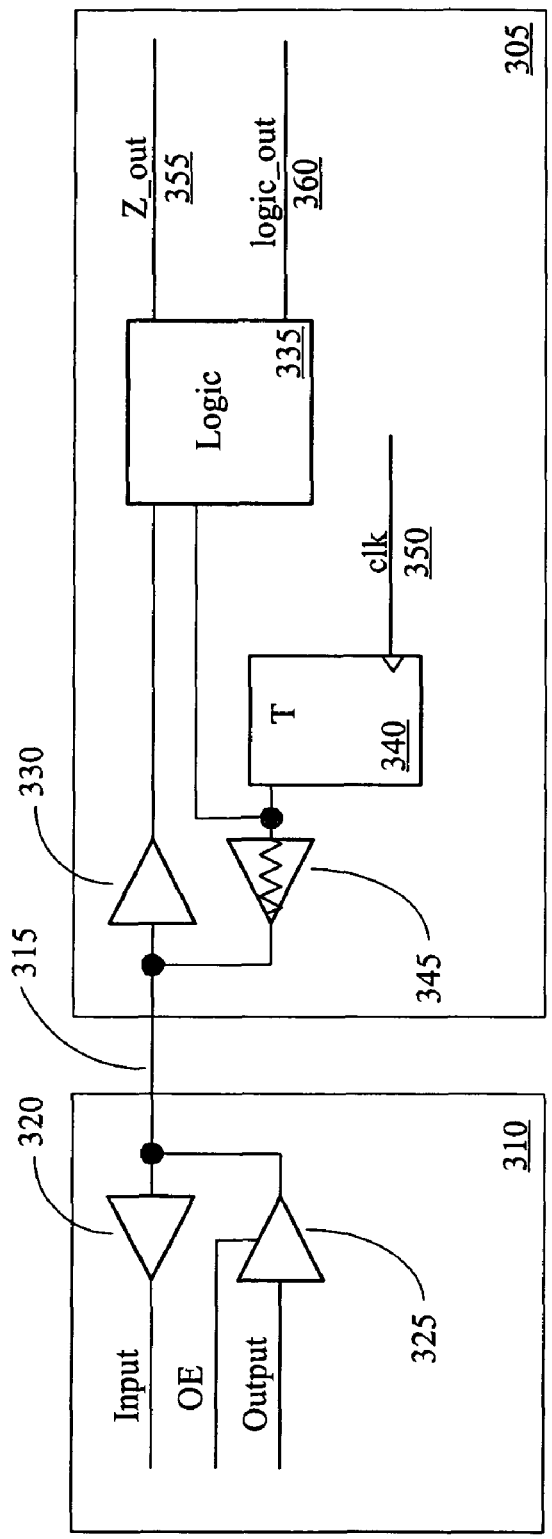
FIG. 3 is a diagram of an embodiment of a circuit to provide signal detection.

FIG. 3 is a diagram of an embodiment of a circuit to provide signal detection. The illustrated circuit is one example of a circuit for ternary signal, but other circuits can also be utilized. In this example, an I/O system 305 is utilized to detect the output of a device under test 310 on a line 315. In this embodiment, the signal on line 315 may be a "high" signal, a "low" signal, or a "non-driven" (or high impedance) signal. The device under test 310 may be any digital device, with the device here showing a driver 325 driving an output signal, with another driver 320 possibly driving the signal as in input.

In one embodiment, the I/O system 305 includes a component to sense a signal, such as an input buffer 330 to drive the signal from the line 315 to a logic circuit 335. The logic circuit may act as a finite state machine. The logic circuit also receives the output of a T-type flip-flop 340, the output of the flip-flop 340 representing an internal signal for use in signal detection. The output of the flip-flop 340 is input to a weak driver 345 to drive a weak signal value on the line 315. The initial state of the flip-flop can arbitrarily be either "high" or "low", and is toggled back and forth between states according to a clock clk 350. The logic circuit 335 then outputs a determined signal Z_out 355, as well as a signal logic_out 360. In one embodiment, a "high" value on Z_out 355 indicates that the sensed signal on line 315 is an undriven signal. A "low" value on Z-out 355 indicates that the sensed signal is a driven signal having the logical value found on logic_out 360.

In operation, the device under test 310 provides a signal by driving a logical signal on the line 315 or by leaving the line undriven. The T-type flip-flop 340 weakly drives a state on the line 315 using weak driver 345. The resulting signal is received by input buffer 330, with the resulting detected signal and the state of the flip-flop 340 being input to the logic circuit 335. If the detected signal and the state of the flip-flop 340 are opposite signals, then the detected signal is the value of the signal on line 315. In this case, Z-out will be "low" and the logical signal value is provided by logic_out 360. If the detected signal and the state of the flip-flop 340 are the same, then the value of the signal is initially uncertain. The clock 350 then toggles the flip-flop 340 and the output of the flip-flop 340 and the detected signal amplified by amplifier 330 are again input to the logic circuit 335. If the detected signal and the state of the flip-flop 340 are now opposite signals, the detected signal is the signal value, and the logical signal value is provided on logic_out 360. If the detected signal and the state of the flip-flop 340 are again the same, then the value of the signal may be deemed to be undriven. In another embodiment, the flip-flop 340 is again toggled and the process continues for one or more additional iterations to provide more certainty in the value of the signal. If the signal is deemed to be undriven, then Z-out will be "high" to indicate that a high-impedance signal has been sensed.

Figure 4A:
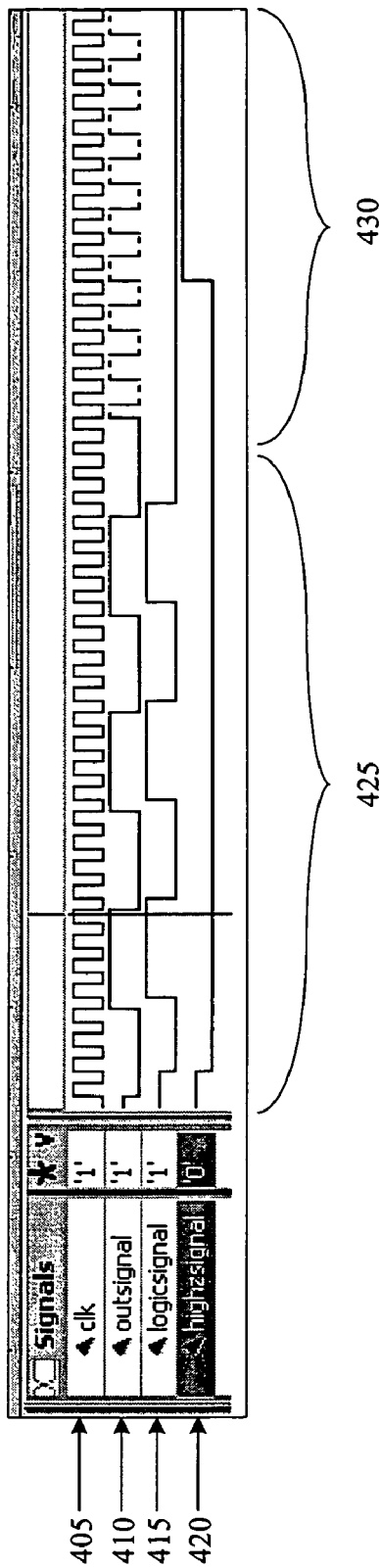
FIGS. 4A and 4B are timing diagrams to illustrate an embodiment of a signal detection process.
Figure 4B:
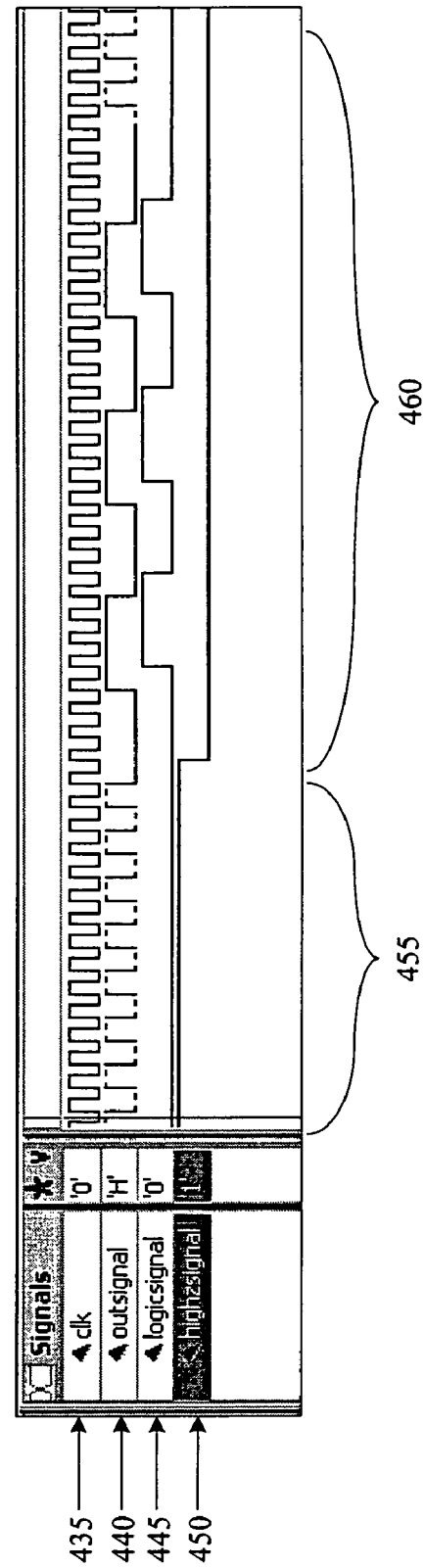

FIGS. 4A and 4B are timing diagrams to illustrate an embodiment of a signal detection process. For simplicity, the timing diagrams illustrate the operation of a simulated circuit and thus the signals provided by an operating system may vary in appearance.

In FIG. 4A, there is illustrated a clock signal "clk" 405, a signal "outsignal" 410 representing a signal on a common net, a signal "logicsignal" 415 to indicate a high or low logical signal value, and a signal "highzsignal" 420 to indicate the presence of a high impedance signal. In one embodiment, the signal "clk" 405 represents an internal clock signal. The signal "highzsignal" 420 is used to indicate whether the signal value that is sensed is a high-impedance signal or is a valid logical level. When "highzsignal" 420 is high ("1") this indicates that a sensed signal value is high-impedance. When "highzsignal" 420 is low ("0") this indicates that the logic level of the signal value sensed is found on the signal "logicsignal" 415.

For a first portion of the simulation 425, the signal "logicsignal" 415 tracks the signal "outsignal" 410 on the common net between the devices, indicating that an external device driving is driving the signal. A finite state machine can determine the value of the driven signal to be the value of the detected signal. However, once the signal "outsignal" is no longer driven by the external device, the weak driver is able to successfully drive the input to alternate high and low states, as can be seen in the second portion of the timing diagram 430. After a certain number of cycles in which the weak driver is able to successfully change the state of the input (three cycles in this example), the finite state machine determines the input is in the high-impedance state, which is indicated by "highzsignal" transitioning to a "high" ("1") value.

The timing diagram shown in FIG. 4B then illustrates a transition from a high-impedance state to a driven state. FIG. 4B again illustrates a clock signal "clk" 430, a signal "outsignal" 435 representing a signal on a common net, a logic signal "logicsignal" 440 to indicate a high or low signal value, and a high impedance signal "highzsignal" 445 to indicate the presence of a high impedance signal. In this example, the system is in a high-impedance state at the leftmost time shown in the waveform, as seen in a first portion 455. This status is indicated by the value of '1' for "highzsignal". After a period of time, the common net "outsignal" is driven by the external device, and the invention's FSM leaves the high-impedance state. This is shown in a second portion 460. The change is indicated by the high-to-low transition of "highzsignal" followed by the matching of "logicsignal" to the common (and now externally driven) net "outsignal".

For illustration, FIGS. 5 and 6 contain sample code in VHDL (VHSIC [Very-High-Speed Integrated Circuit] Hardware Description Language) to simulate signal detection. The sample code can be used to illustrate system operation, such as in generating the timing diagrams provided in FIGS. 4A and 4B. In FIG. 5, the cases in which the line is driven are initially handled. When the input signal "insig" is detected as "0" and the "weakdriver" signal is high, then "highZ_out" is "0" (indicating that a driven signal is present) and the sensed signal provided on logic_out is "0", indicating that the received signal is a "0" value. Similarly, when the input signal is detected as "1" and the weak driver is low, then highZ_out is "0" (indicating that a driven signal is present) and the sensed signal provided on logic_out is "1", indicating that the received signal is a "1" value. Such cases simulate the cases in which the external driver overrides the signal provided by a weak driver. FIG. 5 then provides for handling cases in which the detected signal is aligned with the weak driver, thus either a "0" signal and a low weak driver or a "1" signal and a high weak driver.

FIG. 6 then continues with cases in which the detected signal matches the weak driver signal. In this illustration, a counter highZ_count is incremented each time the detected signal "insig" matches the "weakdriver" value. When the weak driver has toggled the signal value three times, and thus "highZ_count" has reached a binary value of "11", then the signal highZ_out becomes a value of "1", indicating that the detected signal is a high impedance signal.

In conjunction with the sample simulation code provided in FIGS. 5 and 6, FIGS. 7 and 8 contain sample code to define the stimulus for signal detection in the VHDL circuit simulation.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices may be shown in block diagram form.

The present invention includes various processes. Certain processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Certain portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMS, EPROMs, EEPROMs, magnet or optical cards, flash memory, or other type of media/machine-readable medium suitable for storing electronic instructions. Moreover, certain portions of the present invention may also be downloaded as a computer program product, wherein the program may be transferred from a remote computer to a requesting computer by way of data signals embodied in a carrier wave or other propagation medium via a communication link (e.g., a modem or network connection).

Methods herein may be described in their most basic form, but processes can be added to or deleted from any of the methods and information can be added or subtracted from any described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

What is claimed is:

1. A method comprising:
   driving a digital input line with a signal, the driven signal alternating between a first state and a second state in accordance with a clock cycle;
   sensing one or more values of the digital input line;

determining a state of the digital input line based on the sensed values, wherein determining the state of the digital input line comprises determining that the digital input line is in a third state if the sensed value of the digital input line matches the state of the alternating driven signal for a plurality of clock cycles of the alternating driven signal; and incrementing a counter, wherein the counter is incremented when the sensed value of the digital input line matches the state of the alternating driven signal for the plurality of clock cycles and determining the state of the digital input line comprises determining that the digital input line is in the third state if the counter reaches a specified value.

2. The method of claim 1, wherein the first state represents a high state and the second state represents a low state.

3. The method of claim 1, wherein determining the state of the digital input line comprises determining that the digital input line is in the first state if the alternating driven signal is in the second state and the sensed value is the first state.

4. The method of claim 3, wherein determining the state of the digital input line further comprises determining that the digital input line is in the second state if the alternating driven signal is in the first state and the sensed value is the second state.

5. The method of claim 1, wherein the third state represents a high impedance state.

6. The method of claim 1, further comprising waiting a delay period between the driving of the signal and the sensing of the one or more values of the digital input line.

7. An apparatus comprising:
a sensing circuit to sense a digital state for an input line, wherein the input line receives a signal that is one of a high state, a low state, or a non-driven state;
a driver to drive a signal on the input line, the driven signal alternating between a high signal and a low signal in accordance with a clock cycle, wherein the input line is deemed to have received a non-driven signal if a state detected on the input line matches the state of the alternating signal driven on the input line by the driver for a plurality of clock cycles of the alternating driven signal; and incrementing a counter, wherein the counter is incremented when the state detected on the input line matches the state of the alternating signal driven on the input line by the driver for the plurality of clock cycles and the input line is deemed to have received the non-driven signal when the counter reaches a specified value.

8. The apparatus of claim 7, wherein the driver comprises a flip-flop device.

9. The apparatus of claim 7, wherein the driver provides a weaker signal than a normal signal for the input line.

10. The apparatus of claim 7, wherein the input line is deemed to have received a high signal if a high state is detected on the input line after a low signal is driven on the input line by the driver, and wherein the input line is deemed to have received a low signal if a low state is detected after a high signal is driven on the input line by the driver.

11. A sensing device comprising:
a component to sense a state for a digital input;
a driver coupled with the component, the driver to drive a weak signal on the digital input, wherein the weak signal alternates between a high signal and a low signal in accordance with a clock cycle;
a state machine coupled with the component, the state machine to decode a signal on the digital input to one of a plurality of conditions based on the sensed state, wherein the plurality of conditions comprise a low state, a high state, and a high-impedance state, and wherein the state machine decodes the high impedance state if the sensed signal matches the alternating driven signal by the driver for a plurality of clock cycles of the alternating driven signal; and
a counter, wherein the counter is incremented when the sensed signal matches the alternating driven signal by the driver for the plurality of clock cycles and the state machine decodes the high impedance state when the counter reaches a specified value.

12. The sensing device of claim 11, wherein the state machine decodes the high state if the component senses a high signal and the driver drives a low signal.

13. The sensing device of claim 11, wherein the state machine decodes the low state if the component senses a low signal and the driver drives a high signal.

* * * * *